US 6,578,682 B2

(12) United States Patent
Braman et al.

(10) Patent No.: US 6,578,682 B2
(45) Date of Patent: Jun. 17, 2003

(54) COMPACT VIBRATION ISOLATION SYSTEM FOR AN INERTIAL SENSOR ASSEMBLY

(75) Inventors: Todd L. Braman, Columbia Heights, MN (US); Mark J. Riesgraf, Eagan, MN (US); Dale J. Hagenson, Wyoming, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/842,586

(22) Filed: Apr. 26, 2001

(65) Prior Publication Data

US 2002/0158390 A1 Oct. 31, 2002

(51) Int. Cl.[7] .................................................. F16F 7/10
(52) U.S. Cl. .................... 188/378; 267/136; 267/140.13
(58) Field of Search ................................ 188/378, 379, 188/380; 267/136, 140.13; 248/562, 636, 638; 74/574; 73/510, 431, 504.18

(56) References Cited

U.S. PATENT DOCUMENTS

| | | | | |
|---|---|---|---|---|
| 3,167,294 A | * | 1/1965 | Andrews et al. | |
| 3,714,831 A | * | 2/1973 | Quichaud et al. | 73/431 |
| 4,178,811 A | * | 12/1979 | Shepherd | 74/574 |
| 4,395,809 A | * | 8/1983 | Whieley | 188/378 |
| 4,487,402 A | * | 12/1984 | Takayanagi et al. | 267/379 |
| 4,509,781 A | * | 4/1985 | Dick et al. | 188/379 |
| 4,581,933 A | * | 4/1986 | Mansley | 73/431 |
| 5,366,210 A | * | 11/1994 | Grunau et al. | 188/380 |
| 5,389,746 A | * | 2/1995 | Moody | 440/52 |
| 5,474,499 A | * | 12/1995 | Olson | 464/83 |
| 5,878,980 A | * | 3/1999 | Cooley, Jr. | 267/141.3 |
| 5,890,569 A | * | 4/1999 | Goepfert | 188/378 |
| 6,113,030 A | * | 9/2000 | Law et al. | 248/638 |
| 6,202,961 B1 | * | 3/2001 | Wilke et al. | 188/378 |

* cited by examiner

Primary Examiner—Douglas C. Butler
Assistant Examiner—Robert A. Siconolfi (57) ABSTRACT

Disclosed is a compact vibration isolation system for mounting an inertial sensor assembly (ISA) to an Inertial Measurement Unit (IMU) housing. The housing is mounted to a support that is subjected to shock and vibration. The vibration isolator assembly includes a ring shaped elastomeric member laminated between a ring shaped inner member and a ring shaped outer member. The inner member is securely mounted to the ISA, and the outer member is mounted to a support of the IMU housing. Because of the compact size of this system, the IMU housing contains and protects the elastomeric member from potential contamination and damage, as well as eliminates the need for delicate mechanical and electrical interfaces. The elastomeric member of the system isolates the ISA from shock, vibration, and acoustic energy that may otherwise be transmitted from the support to the ISA.

12 Claims, 7 Drawing Sheets

COMPACT VIBRATION ISOLATION SYSTEM FOR AN INERTIAL SENSOR ASSEMBLY

BACKGROUND OF THE INVENTION

This invention relates to compact vibration isolation systems for limiting the transmission of externally generated vibrational, shock, and acoustic energy to mechanically sensitive components.

In certain environments, it is necessary to isolate mechanically sensitive assemblies from shock, vibrational, and acoustic energy. In many applications, this is accomplished by placing the sensitive components within some form of container or housing. Resilient, shock and vibration absorbing mounts are frequently used to limit transmission of externally generated vibrational and shock energy into the housing containing the sensitive assemblies.

The need to isolate a device from shock, vibrational, and acoustic energy is particularly acute when the device is an inertial sensor assembly (ISA), which is the sensor suite for an inertial measurement unit (IMU). An ISA typically includes inertial sensors that detect acceleration and rotation in three planes. Usually there are three accelerometers and three rotational rate sensors arranged with their input axes in a perpendicular relationship. The sensors are generally rigidly and precisely mounted within a housing along with related electronics and hardware. Commonly, the housing is in turn mounted to a support or chassis through suspension mounts or vibration isolators. In turn, the chassis is rigidly and precisely mounted to a frame of a vehicle, such as an aircraft.

In operation, the sensors provide inertial data, such as linear and angular acceleration information to a navigational computer on board the aircraft. The navigational computer processes the data for flight control and/or navigation of the aircraft. For optimum performance, the sensors of the ISA must provide precise inertial data to the navigational computer. Aircraft maneuvers (i.e., acceleration; changes in roll, pitch, and yaw; takeoff and landing), turbulence and engine operation all generate shock, vibration, and acoustic energy that is conveyed through the aircraft frame to the support for the ISA. This energy may manifest itself as linear or angular errors in the inertial data provided by the sensors to the navigational computer. Hence, there is a need for a vibration isolator which provides shock and vibration isolation of the ISA. Before discussing the present invention, it will be beneficial to discuss the prior art for purposes of comparison.

Figure 1:
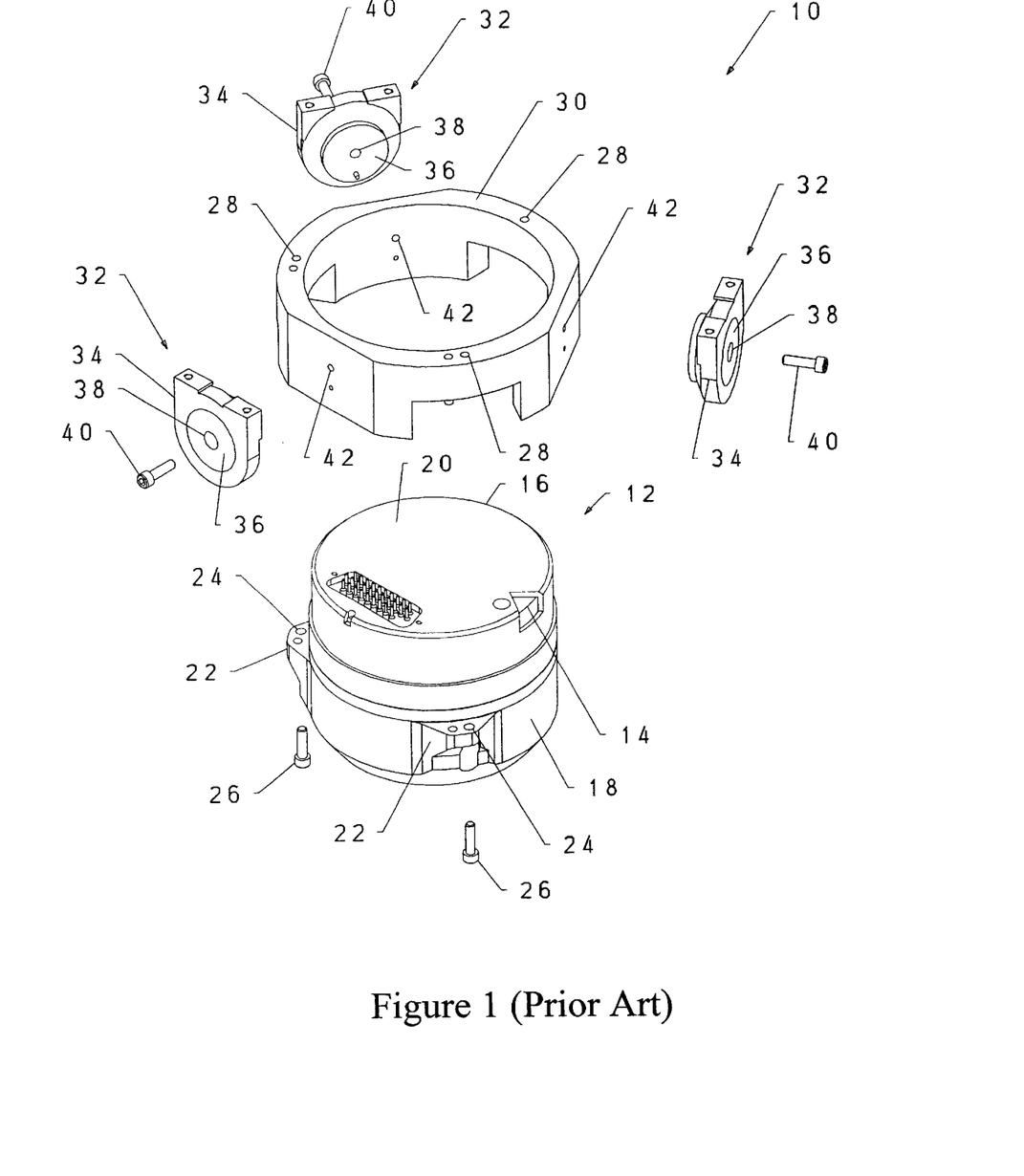
FIG. 1 is an exploded perspective view of a multiple mount vibration isolator system for an inertial sensor assembly known to those skilled in the art.
Figure 2:
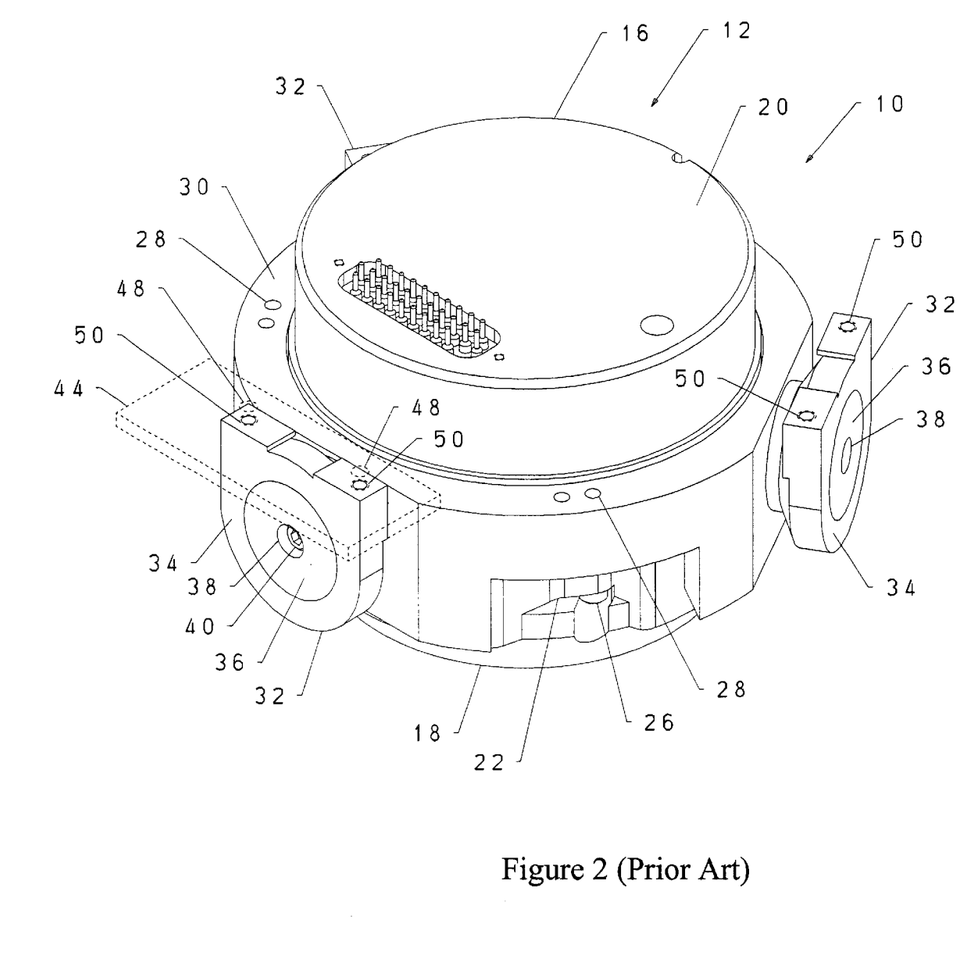
FIG. 2 is an assembled perspective view of the known vibration isolator system shown in FIG. 1.

One such known vibration isolator system 10 for an ISA 12 is illustrated in FIGS. 1 and 2. FIG. 1 is an exploded perspective view of a multiple mount vibration isolator system for an inertial sensor assembly known to those skilled in the art. FIG. 2 is an assembled perspective view of the known vibration isolator system shown in FIG. 1.

As shown in FIG. 1, ISA 12 includes inertial sensors 14 mounted within housing 16, defined by base member 18 and cover member 20. Inertial sensors 14 are defined by three accelerometers and three ring laser gyroscopes and their associated electronics and hardware.

Base member 18 of housing 16 includes three mounting lugs 22 (only two of which can be seen in FIG. 1) equally spaced about the circumference of base member 18. Each mounting lug 22 includes an aperture 24 adapted to receive a threaded fastener 26. Fasteners 26 engage cooperating, threaded openings 28 of inertia ring 30 to rigidly secure the ISA 12 to inertia ring 30.

Vibration isolator system 10 includes three isolator mounts 32. Each isolator mount 32 includes an outer frame 34 adapted to hold an elastomeric element 36 that provides isolator mount 32 with its shock and vibration isolation functionality. Elastomeric element 36 is a donut-shaped member with inner aperture element 38. Elastomeric element 36 is injection molded onto outer frame 34. Inner aperture element 38 of each elastomeric element 36 is adapted to receive a threaded fastener 40. Each threaded fastener 40 engages a cooperating threaded hole 42 in inertia ring 30 to secure the elastomeric element 36 of the respective isolator mount 32 to inertia ring 30 secured to the ISA 12. Isolator mounts 32 are equally spaced about inertia ring 30.

As seen best in FIG. 2, outer frames 34 of isolator mounts 32 are secured to support 44 (shown in dashed lines in FIG. 2, and only partially shown relative to one of the isolator mounts 32 for clarity) via threaded fasteners. The fasteners pass through apertures 48 of support 44 to engage threaded openings 50 of outer frames 34 of isolator mounts 32.

Though isolator mounts 32 of the vibration isolator system 10 adequately isolate ISA 12 from shock and vibration energy conveyed through support 44, there are some difficulties encountered with the use of multiple, discrete isolator mounts. For example, when using multiple discrete isolator mounts, it is necessary to match the natural frequencies of each of the isolator mounts to be used on a selected ISA. In other words, because natural frequency matching is commonly required at the ISA integration level, each individual isolator mount must be tested, segregated, and marked according to its specific natural frequency and amplification factor. The segregated isolator mounts are then packaged as matched sets for installation to a selected ISA. If one isolator mount of the matched set is damaged or lost during the assembly process, the entire matched set must be scrapped since unmatched mounts may allow uncompensatable motion of the ISA which will result in inertial data errors.

Another difficulty encountered with the use of multiple discrete isolator mounts results because the discrete mounts are attached at various locations about the ISA. Care must be taken to accurately mount and align the center of gravity (CG) of the ISA on the elastic centers of the isolator mounts. Otherwise CG and elastic center offsets may result in uncompensated rocking and coning motions in the ISA which will manifest themselves in inertial data errors. Therefore, multiple discrete isolator mount systems are expensive and difficult to manufacture and use.

Figure 3:
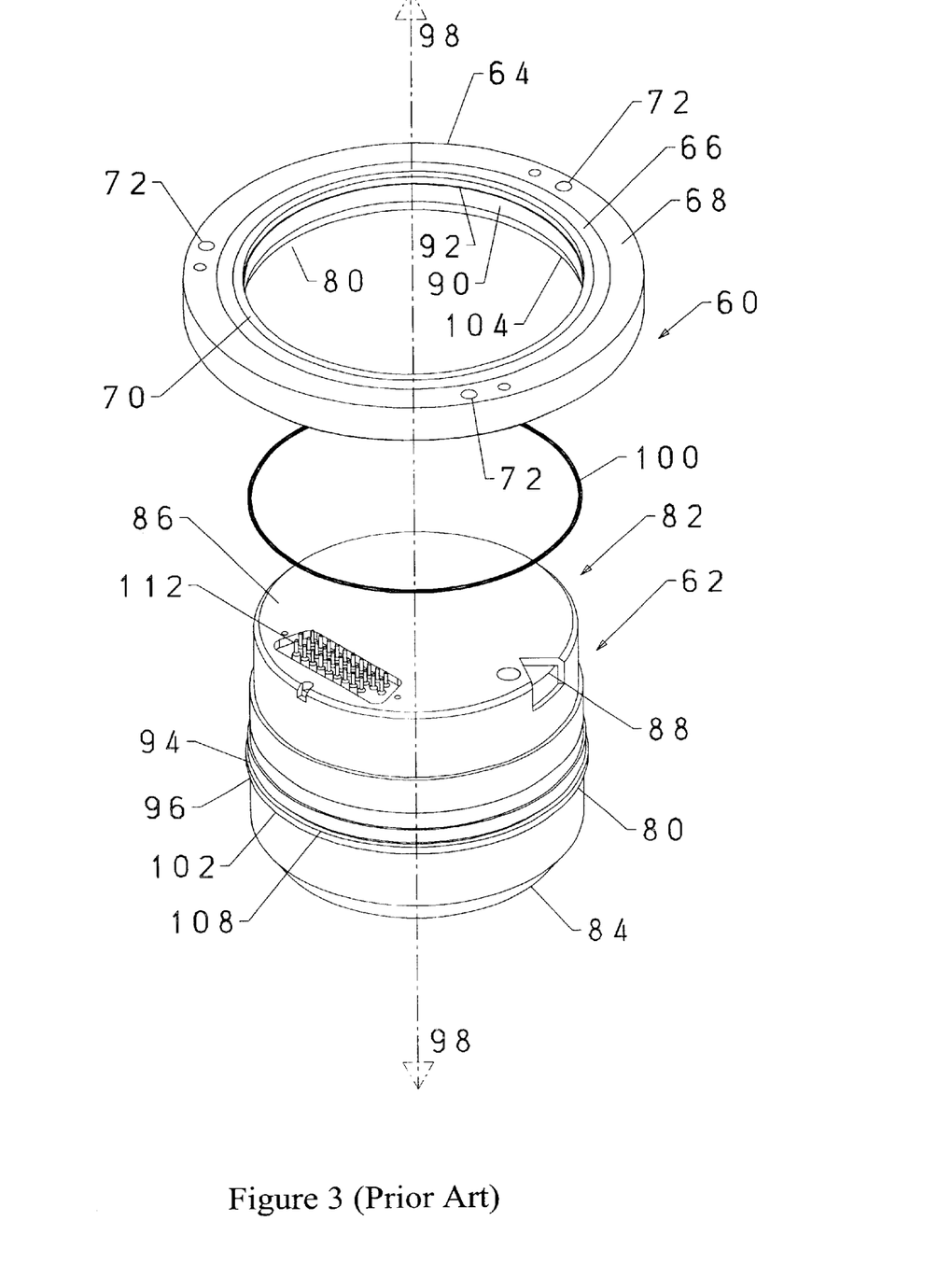
FIG. 3 is an exploded perspective view of a vibration isolator system for an inertial sensor assembly known to those skilled in the art.
Figure 4:
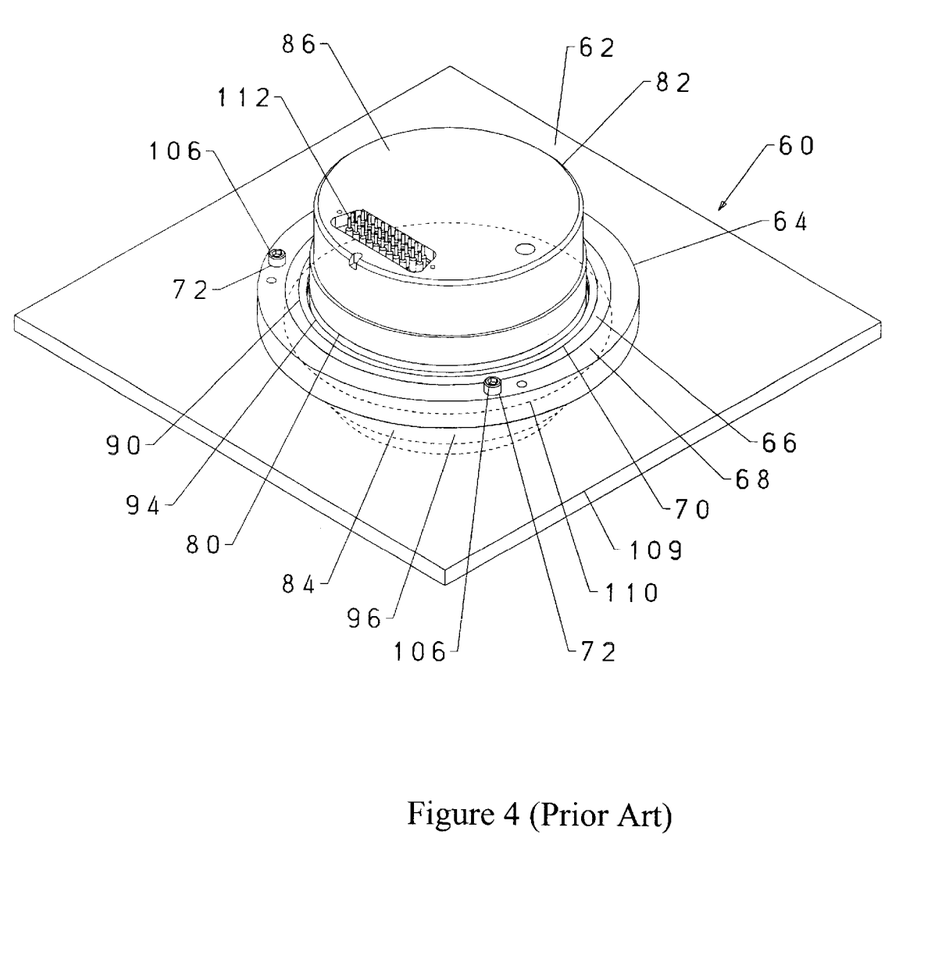
FIG. 4 is an assembled perspective view of the known vibration isolator system shown in FIG. 3.

A second such known vibration isolation system 60 for a ring laser gyroscope ISA 62 is disclosed in U.S. Pat. No. 5,890,569 to Goepfert and illustrated in FIGS. 3–4. FIG. 3 is an exploded perspective view of a vibration isolator system for an inertial sensor assembly known to those skilled in the art. FIG. 4 is an assembled perspective view of the known vibration isolator system shown in FIG. 3.

As seen in FIG. 3, vibration isolator system 60 includes isolator mount 64 defined by annular elastomeric member 66, rigid annular outer member 68, and rigid annular inner member 70. Outer member 68 encircles and is concentric with elastomeric member 66. Inner member 70 is encircled by and is concentric with elastomeric member 66. Outer member 68 also includes three apertures 72 equally spaced (i.e., 120 degrees apart) about the periphery of outer member 68.

Coupling apparatus 80 attaches inner ring 70 of vibration isolator system 60 to housing 82 of ISA 62. Housing 82 is defined by base member 84 and cover member 86. Housing 82 contains and protects inertial sensors 88 of ISA 62.

Coupling apparatus 80 includes an adjustment mechanism defined by threaded region 90 on inner side wall 92 of inner member 70. Threaded region 90 mates with cooperating threaded portion 94 on outer side wall 96 of base member 84 of housing 82. Threaded interengagement of threaded region 90 with threaded portion 94 attaches ISA 62 to vibration isolator system 60 and permits limited linear movement of housing 82 of ISA 62 along longitudinal axis 98 of ISA 62, which is perpendicular to a plane defined by elastomeric member 66. The limited linear movement permitted by the threaded interengagement referred above allows alignment of a lateral center of gravity of ISA 62 (i.e., housing 82) with an elastic center of elastomeric member 66 of vibration isolator system 60.

Coupling apparatus 80 further includes a stop mechanism, defined by resilient member 100, that acts between ledge section 102 on outer side wall 96 of base member 84 of housing 82 and ledge region 104 on inner side wall 92 of inner member 70. Resilient member 100 is retained within channel 108 on outer side wall 96 of base member 84. Resilient member 100 provides a spring force that acts between housing 82 and inner member 70 upon compression of the resilient member between ledge section 102 and ledge region 104 as ISA 62 is screwed onto vibration isolator system 60. The spring force maintains the position of ISA 62 relative to vibration isolator system 60, and thereby maintains the alignment of the lateral center of gravity of ISA 62 with the elastic center of vibration isolator system 60.

As seen in FIG. 4, apertures 72 are adapted to receive threaded fastener 106 (only two of which can be seen. Threaded fasteners 106 engage threaded holes (not seen) in support 109, which is subject to shock and vibration. Support 109 has an opening 110 adapted to freely receive the ISA 62 therethrough. The support 109 is part of a vehicle.

Vibration isolator system 60 isolates ISA 62 from shock and vibration that may otherwise be transmitted from support 109 to ISA 62. Vibration isolator system 60 eliminates the need to match the natural frequencies of multiple isolator mounts since only a single elastomeric member 66 is used.

However, some difficulties are encountered with the use of isolation system 60. For example, making the interconnection between electrical connector 112 and the system computer (not shown) is difficult. If not performed according to specific requirements, the interconnect will exhibit external forces that will create uncompensatable motion of ISA 62, which will result in inertial data errors. For example, any pressure, load or force on the connector field can translate directly to housing 82, independent of support 109 and isolation system 60, causing vibration error. Because various applications will have different interconnect requirements, the interconnect must be carefully designed, manufactured, and tested for each application, with great expense and effort.

Another difficulty encountered with the use of vibration isolator system 60 is that it is difficult to align the elastic center of elastomeric member 66 with the center of gravity (CG) of ISA 62. This is only accomplished by modifying the location of the stop mechanism ledge 102 of the base member 84, and is limited by the thread pitch of threaded region 90 and the alignment requirement of mounting hole 72. This requires machining of new base members 84, and does not allow rework of existing base members 84. If the elastic center of elastomeric member 66 is not adequately aligned with the center of gravity (CG) of ISA 62, uncompensatible motion of ISA 62 will be generated, which will result in inertial data errors.

Additionally, elastomer member 66 is not protected and is exposed to external elements. Dirt and many chemicals and other contaminants will degrade the isolator performance, resulting in problems ranging from inertial data errors to catastrophic failures.

Moreover, adequate space about the entire ISA 62, inner member 70, and elastomeric member 66, is required. This space, called sway space, is required due to the motion that ISA 62, inner member 70, and elastomeric member 66 experience during vibration and shock. If this sway space is not maintained, uncompensatable motion of ISA 62 will be generated, which will result in inertial data errors. This sway space requirement is a direct function of the amplitude of the vibration and shock, and is maintained at 0.075 inches in one embodiment.

There is a need for improved vibration isolator systems for ISA's. In particular, there is a need for a vibration isolator system that eliminates the need to match the natural frequencies of multiple isolator mounts while providing acceptable shock, vibration, and acoustic isolation of the ISA. In addition, it should be relatively easy to align the elastic center of the vibration isolator system with the CG of the ISA, the elastomer members should be protected from the environment, and the interfaces (both the mounting and electrical interconnect) should be simple. Lastly, the vibration isolator system should be relatively easy and inexpensive to manufacture.

BRIEF SUMMARY OF THE INVENTION

The present invention is a vibration isolation system for mounting an inertial sensor assembly (ISA) to a support that is subjected to shock, vibration, and acoustic energy, while allowing the inertial measurement unit (IMU) housing to shield and protect the elastomeric member and eliminate the need for a complex IMU interconnect. The vibration isolation system also minimizes uncompensatable motion caused by unwelcome forces. This can be done by minimizing the offset between the center of gravity of the ISA and the center of elasticity of the elastomeric member, and by eliminating mechanical and electrical interface issues. The vibration isolation system uses an integral elastomeric system to absorb and dampen shock, vibrational, and acoustic energy. The vibration isolation system includes a rigid ring shaped inner member, a rigid ring shaped outer member, and a ring shaped elastomer member. The outer member encircles the elastomeric member and is fixed thereto. In addition, the outer member is secured to the IMU housing, which is secured to the support. The inner member is encircled by the elastomeric member and is fixed to the elastomeric member. Moreover, the inner member is secured to the ISA such that the elastomeric member isolates the ISA from vibration, shock, and acoustic energy that may otherwise be transmitted from the support to the ISA. The vibration isolation system eliminates the need to match the natural frequency of multiple isolator mounts, since only a single elastomeric member is used. In addition, since there is only a single elastomeric member, it is relatively easy to align the elastomeric center of the elastomer member with the center of gravity of the ISA. The vibration isolation system provides improved shock, vibration, and acoustic isolation of the ISA and is easy and inexpensive to manufacture.

DETAILED DESCRIPTION

Figure 5:
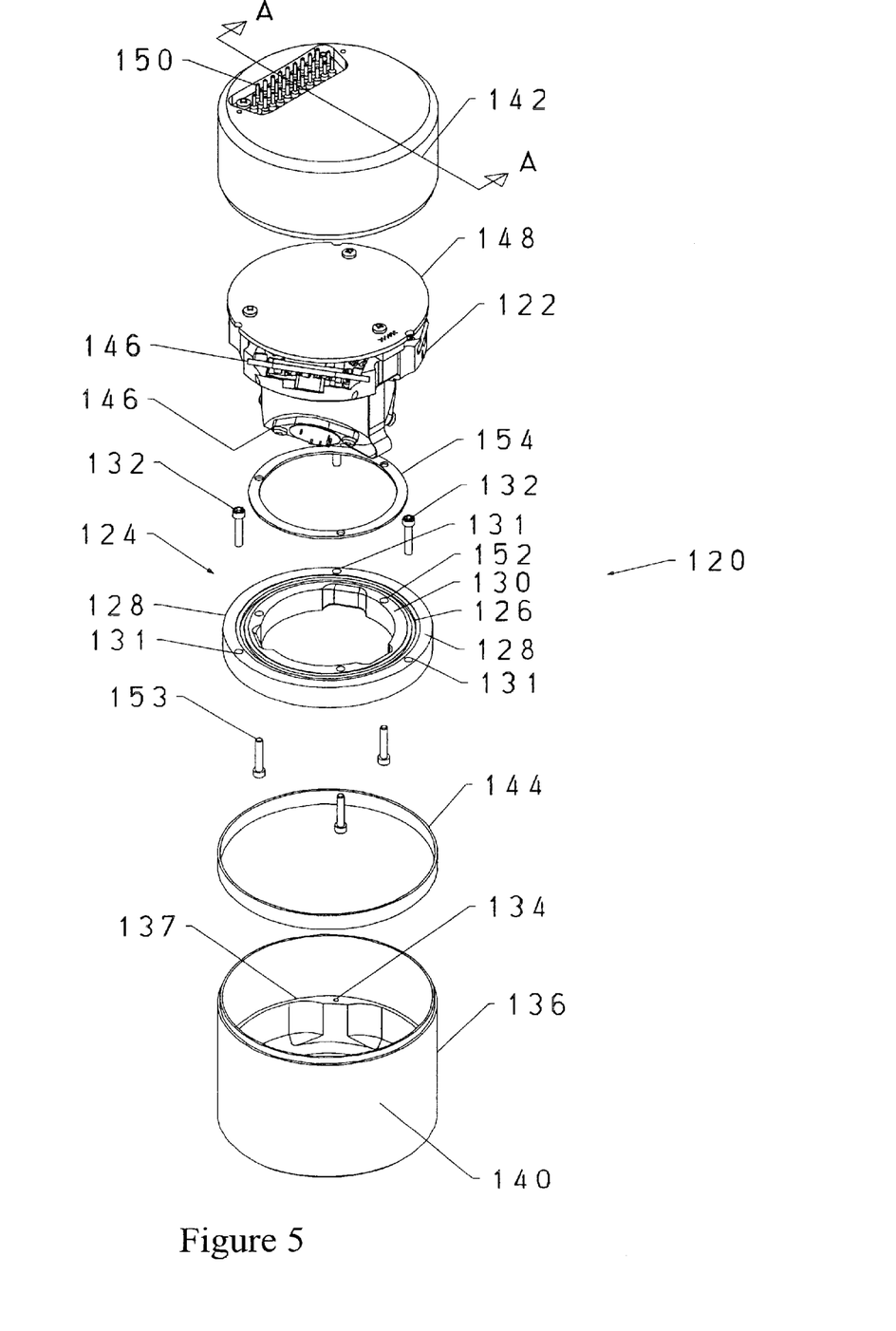
FIG. 5 is an exploded perspective view of a vibration isolator system for an inertial sensor assembly in accordance with the present invention.
Figure 6:
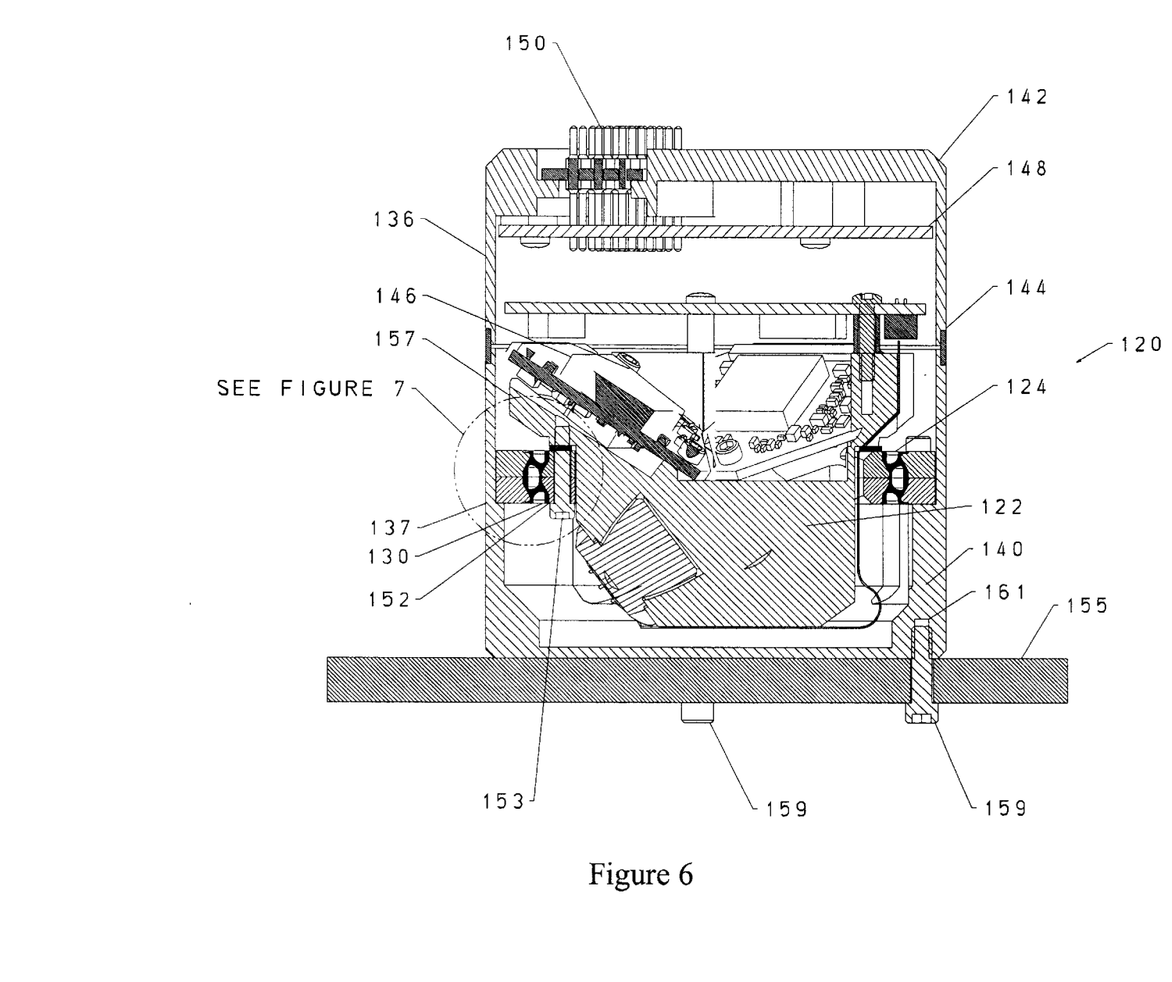
FIG. 6 is a sectional view, taken along line A—A of FIG. 5, of the assembled vibration isolator system of the present invention.
Figure 7:
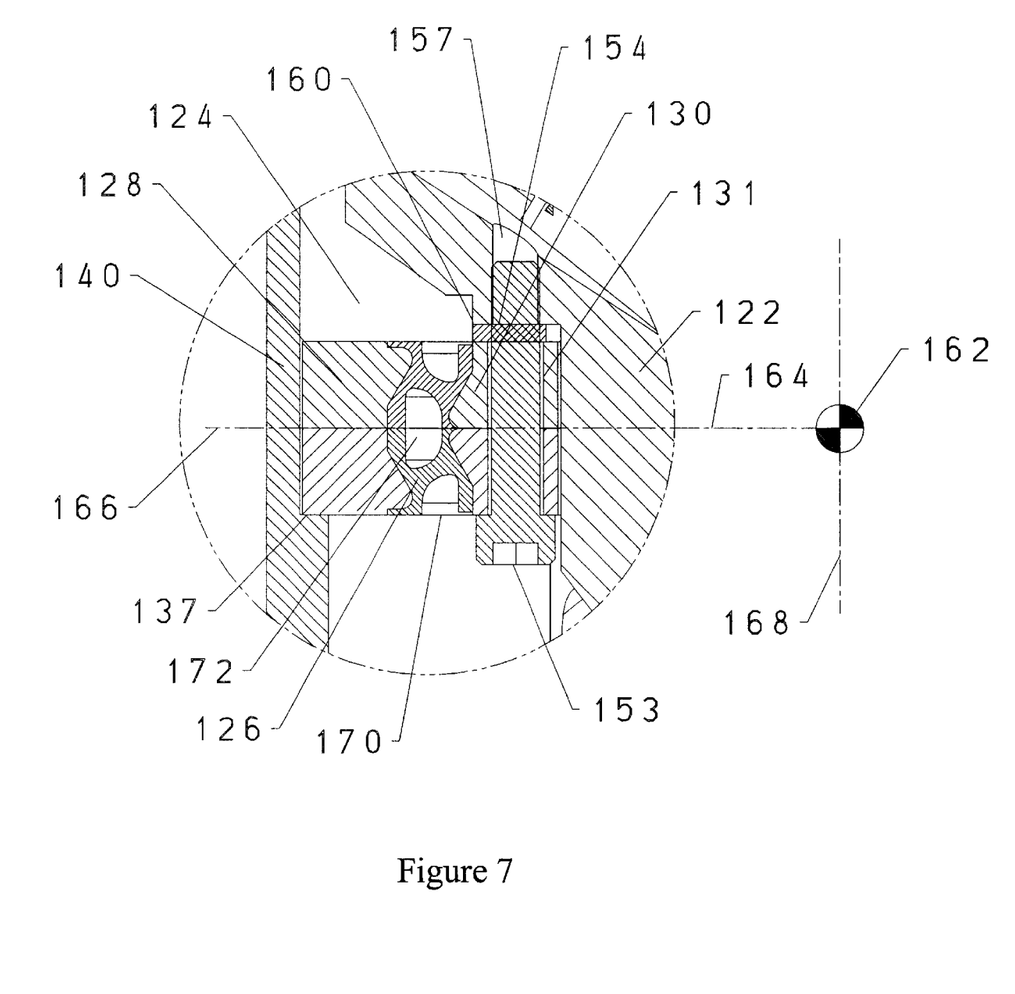
FIG. 7 is an enlarged partial sectional view of the vibration isolator system, as circled in FIG. 6.

A preferred embodiment for a vibration isolation system 120 for an inertial sensor assembly (ISA) 122 in accordance with the present invention is illustrated generally in FIGS. 5–7. As seen in FIG. 5, vibration isolation system 120 includes an isolator mount 124 defined by a ring shaped elastomeric member 126, a rigid ring shaped outer member 128 and a rigid ring shaped inner member 130. Outer member 128 encircles and is concentric with the elastomeric member 126. Inner member 130 is encircled by and is concentric with elastomeric member 126. Outer member 128 also includes three apertures 131 equally spaced (i.e., 120 degrees apart) about the periphery of outer member 128. Apertures 131 are adapted to receive a threaded fastener 132 (only two of which can be seen in FIG. 5). Threaded fasteners 132 engage threaded holes 134 in Inertial Measurement Unit (IMU) housing 136, and outer member 128 rests on ledge 137 of base member 140 of housing 136.

Isolator mount 124 is fixed between ISA 122 and IMU housing 136. IMU housing 136 is defined by a base member 140 and a cover member 142, which are sealed together by an interface ring 144 in a manner known in the art. IMU housing 136 contains and protects isolation system 120, inertial sensors 146 mounted on ISA 122, and required electronics 148. IMU housing 136 protects elastomeric member 126 from potential contamination and damage, as well as eliminates the need for delicate mechanical and electrical interfaces. In one preferred embodiment, inertial sensors 146 are defined by three accelerometers and three micro-machined silicon rate sensors and their associated electronics and hardware as is generally known in the art. Electrical connector 150, mounted in cover member 142, allows inertial data to be transmitted between the inertial sensors 146 and a navigational computer (not shown) onboard the vehicle. Because isolator mount 124 resides inside housing 136, it isolates ISA 122 from all external forces on housing 136, thereby preventing inertial data errors. This allows system 120 to benefit from a very simple interconnect between IMU housing 136 and the navigational computer, with no concerns about pressure, load or force on the connector field.

Apertures 152 are adapted to accept threaded fasteners 153. Threaded fasteners 153 engage threaded holes (not seen) in ISA 122. Spacer 154 may be used to align the lateral center of gravity of ISA 122 with the elastic center of elastomeric member 126.

FIG. 6 is a cross-sectional view, along a vertical plane at line A—A, of the assembled vibration isolator system 120 shown in FIG. 5. As seen best in FIG. 6, isolator mount 124 is fixed to ISA 122. Apertures 152 in inner member 130 and apertures 157 in ISA 122 receive threaded fasteners 153, thereby securing isolator mount 124 to ISA 122. Housing 136 contains the assembly of isolator mount 124 and ISA 22, with outer member 128 resting of ledge 137 of base member 140. IMU housing 136 is mounted, by threaded fasteners 159, to support 155, through apertures 161. Support 155 is part of a vehicle. In one preferred embodiment, support 155 is a chassis attached to the frame of an aircraft.

FIG. 7 is an enlarged partial sectional view of vibration isolator system 120, as circled in FIG. 6. As seen best in FIG. 7, spacer 154 can be placed between mounting surface 160 of isolator mount 124 and ISA 122. The thickness of spacer 154 can be adjusted to align lateral center of gravity 162 of ISA 122 with elastic center 164 of elastomeric member 126. Lateral center of gravity 162 lies along lateral axis 166, which is perpendicular to longitudinal axis 168. Elastomeric member 126 is fixed to inner member 130 along an outer side wall of inner member 130. Elastomeric member 126 may embody any substantially annular configuration. In a preferred embodiment, elastomeric member 126 includes cutout regions 170 and internal pocket 172 that are concentric with outer and inner members 128 and 130, respectively. Pocket 172 may be formed into elastomeric member 126 by assembling elastomeric member 126 from two symmetric back to back isolator halves. In a preferred embodiment, forces from threaded fasteners 132 and 153 are adequate to hold the two halves of elastomeric member 126 together. Regions 170 and 172 provide elastomeric member 126 with flexibility that aids in damping and absorbing unwanted shock, vibration, and acoustic energy transmitted by support 155. Additionally, removal of material from the center of elastomeric member 126 reduces fatigue and stress on member 126 which could otherwise cause isolation system 120 to fail.

Elastomeric element 126 may be composed of any elastomeric material. In one preferred embodiment, elastomeric element 124 is manufactured of a phenyl-methyl vinyl silicone rubber of the form 2FC303A19B37E016F1-11G11 as specified in the American Society for Testing and Materials (ASTM) document ASTM-D2000. Materials of this type are fabricated by numerous manufacturers for a variety of associated applications. The outer and inner members 128 and 130, respectively, may be made of practically any material. In a preferred embodiment, they are manufactured of a tempered aluminum alloy, industrial standard 6061-T6, which is chosen for its high strength, machinability, light weight, low cost, and widespread availability. Outer and inner members 128 and 130 may be treated to improve the adhesion of elastomeric material 126. In a preferred embodiment, they are chemically treated with chromate.

In one preferred embodiment, the silicone rubber elastomeric material is injection molded under high temperature and pressure into a cavity between outer and inner members 128 and 130, respectively. The silicone rubber material bonds to the chemically treated metal surfaces of outer and inner rings 128 and 130, respectively, and holds isolator mount 124 together. The silicone rubber material provides vibration isolator system 120 with its primary isolator and damping functionality. Again, the use of two symmetric isolation assemblies can be used to increase ease of manufacture.

Vibration isolator system 120 isolates ISA 122 from shock and vibration that may otherwise be transmitted from support 155 to the ISA 122. Vibration isolator system 120 eliminates the need to match the natural frequencies of multiple isolator mounts since only a single elastomeric member 126 is used. In addition, since there is only a single elastomeric member 126, it is relatively easy to align the elastic center 164 of the elastomeric member 126 with the center of gravity (CG) 162 of the ISA 122. Moreover, system 120 is very compact. In a preferred embodiment, IMU housing 136 has a diameter of about 2½ inches and a height of about 3 inches. Vibration isolator system 120 provides acceptable shock and vibration isolation of ISA 122 and is relatively easy and inexpensive to manufacture.

Although the present invention has been described with reference to preferred embodiments, workers skilled in the art will recognize that changes may be made in form and detail without departing from the spirit and scope of the invention.

What is claimed is:

1. A vibration isolation system for mounting an inertial sensor assembly to a support that is subject to shock and vibration, comprising:
   an inertial measurement unit housing comprising a plurality of parts which are sealed together, thereby enclosing the inertial sensor assembly, wherein the housing is mounted to the support;
   an annular elastomeric member;
   an annular outer member encircling the elastomeric member and being fixed thereto, the outer member disposed within the housing and adapted to be secured to the housing; and
   an annular inner member encircled by the elastomeric member and being fixed thereto, the inner member adapted to be secured to the inertial sensor assembly.

2. The vibration isolation system of claim 1 in which the elastomeric member is manufactured of a silicone rubber elastomeric material.

3. The vibration isolation system of claim 1 further comprising a coupling apparatus for attaching the inertial sensor assembly and the inner member which includes an adjustment mechanism for permitting relative movement on a longitudinal axis between the elastomeric member and the inertial sensor assembly, which longitudinal axis is perpendicular to a plane defined by the elastomeric member.

4. The vibration isolation system of claim 3 in which the coupling apparatus comprises a plurality of threaded fasteners associated with the inner member and a plurality of threaded apertures associated with the inertial sensor assembly.

5. The vibration isolation system of claim 3 further comprising a longitudinal spacer between the mounting surfaces of the inertial sensor assembly and the inner member for aligning a center of gravity of the inertial sensor assembly and an elastic center of the elastomer along a lateral axis.

6. The vibration isolation system of claim 5 in which a first plurality of threaded fasteners associated with the outer member cooperate with a first plurality of threaded apertures in the housing.

7. The vibration isolation system of claim 6 in which a second plurality of threaded fasteners associated with the support cooperate with a second plurality of threaded apertures in the housing.

8. The vibration isolation system of claim 1 in which the housing comprises:
   a cover member;
   a base member; and
   an interface ring which seals the cover member and base member together.

9. A vibration isolation system for mounting an inertial sensor assembly to a support that is subject to shock and vibration, comprising;
   a housing that contains the inertial sensor assembly and is mounted to the support;
   an annular elastomeric member comprising a concentric, internal pocket;
   an annular outer member encircling the elastomeric member and being fixed thereto, the outer member adapted to be secured to and within the housing; and
   an annular inner member encircled by the elastomeric member and being fixed thereto, the inner member adapted to he secured to the inertial sensor assembly.

10. The vibration isolation system of claim 1 in which the annular elastomeric member comprises a concentric cutout region along an external surface of the member.

11. A vibration isolation system for mounting an inertial sensor assembly to a support that is subject to shock and vibration, comprising:
    a housing that contains the inertial sensor assembly and is mounted to the support;
    an annular elastomeric member comprising:
       a concentric, internal pocket; and
       a concentric, cutout region along an external surface of the member;
    an annular outer member encircling the elastomeric member and being fixed thereto, the outer member adapted to be secured to and within the housing; and
    an annular inner member encircled by the elastomeric member and being fixed thereto, the inner member adapted to be secured to the inertial sensor assembly.

12. The vibration isolation system of claim 1 in which the annular outer member and annular inner member are manufactured of an aluminum alloy material.

* * * * *